United States Patent
Stoffels et al.

(10) Patent No.: US 8,739,751 B2
(45) Date of Patent: Jun. 3, 2014

(54) METHOD FOR AVOIDING TURBOCHARGER DAMAGE

(75) Inventors: Harald Stoffels, Cologne (DE); Ludwig Stump, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 13/285,716

(22) Filed: Oct. 31, 2011

(65) Prior Publication Data

US 2012/0123666 A1   May 17, 2012

(30) Foreign Application Priority Data

Nov. 15, 2010 (DE) .................. 10 2010 043 920

(51) Int. Cl.
*F02D 23/00* (2006.01)

(52) U.S. Cl.
USPC ............. 123/179.4; 123/179.14; 123/179.15; 123/559.1; 701/113

(58) Field of Classification Search
USPC ................. 123/179.3, 179.4, 179.14, 179.15, 123/559.1, 196 R, 198 D; 701/110–113; 60/608
See application file for complete search history.

(56) References Cited

U.S. PATENT DOCUMENTS

| | | | | |
|---|---|---|---|---|
| 6,817,330 | B1 * | 11/2004 | Ogawa et al. | 123/179.4 |
| 6,941,218 | B2 * | 9/2005 | Wolf et al. | 701/112 |
| 7,036,477 | B1 * | 5/2006 | Thompson et al. | 123/179.4 |
| 7,079,940 | B2 * | 7/2006 | Scholt et al. | 701/112 |
| 8,095,291 | B2 * | 1/2012 | Christen et al. | 701/102 |
| 8,355,859 | B2 * | 1/2013 | Maki et al. | 701/113 |
| 2009/0133946 | A1 | 5/2009 | Pels et al. | |

* cited by examiner

*Primary Examiner* — Hai Huynh
(74) *Attorney, Agent, or Firm* — Julia Voutyras; Alleman Hall McCoy Russell & Tuttle LLP (57) ABSTRACT

A method for operating an engine of a motor vehicle is provided. The method comprises operating at least one turbocharger, operating a start/stop automatic system which automatically switches off the internal combustion engine when a stop condition is met, and automatically starts the internal combustion engine when a starting condition is met, and when the stop condition is met, delaying the automatic switching off of the internal combustion engine by a predefinable delay time (Δt). In one example, automatic shut off of the engine may be delayed in order ensure adequate cooling of the turbocharger.

20 Claims, 5 Drawing Sheets

METHOD FOR AVOIDING TURBOCHARGER DAMAGE

RELATED APPLICATIONS

The present application claims priority to German Patent Application No. 102010043920.7, filed on Nov. 15, 2010, the entire contents of which are hereby incorporated by reference.

FIELD

The present disclosure relates to a method for operating an internal combustion engine.

BACKGROUND AND SUMMARY

Turbochargers and exhaust gas turbochargers are used widely in series-produced motor vehicles, in order to increase the power of the respective vehicle engines. According to the design which is customary today, exhaust gas turbochargers have a rotor with a compressor wheel and a turbine wheel and a shaft which is arranged between the compressor wheel and the turbine wheel and is rotatably mounted in corresponding rotor bearings on the turbine side and the compressor side. The rotor bearings can generally be sliding bearings or roller bearings with oil lubrication. The bearings are usually supplied with lubricant by means of lubricant, for example engine oil, which is conducted to the individual bearing points via a pressure line, for example. The lubricant has both the object of lubricating the bearings and the function of cooling them. The cooling is highly significant, in particular in the case of the turbine-side bearing, since a significant quantity of heat is conducted into the shaft by the hot turbine wheel.

An operating state which is particularly difficult to cope with for this reason is the rapid shutting down of the internal combustion engine from an operating state with a high load. The supply of lubricant is interrupted when stopping occurs and the conduction of heat away from the shaft is no longer ensured. This results in overheating of the lubricant oil and an associated carbonization of the lubricating oil remaining in the exposed parts of the bearings, as a result of the subsequent heating of the shaft which is caused by the hot turbine. The carbonization of the lubricating oil finally causes the rotor bearings to be covered in soot, which is frequently the cause of turbocharger damage.

The abovementioned critical operating state, that is to say the rapid shutting down of the internal combustion engine from an operating state with a high load, can be found to occur particularly in motor vehicles with what are referred to as a start/stop automatic system, said system automatically switching off the internal combustion engine if, for example, no drive energy is used to propel the motor vehicle (stop condition) when it is stopped at a traffic light. When starting occurs (starting condition), the internal combustion engine is then started and the vehicle accelerates up to the next braking process.

Start/stop devices for motor vehicles are known in which the operating state of the vehicle and of the operator control pedals, for example the accelerator pedal and/or brake pedal, are determined and evaluated in order to switch off and start the internal combustion engine again. Such start/stop devices are suitable particularly for vehicles in short-range traffic or town traffic in order to reduce the fuel consumption and the exhaust gas emissions. They are now found in widespread application both in conventional motor vehicles and in low-energy vehicles, hybrid vehicles and the like.

Combining an internal combustion engine which can be supercharged by a turbocharger with a start/stop automatic system therefore heightens the risk of what is referred to as "hot-soak", that is to say the destruction or damaging of the turbocharger, that is to say carbonization of the turbocharger, in particular of the lubricating oil which is present in the rotor bearings.

The inventors herein have recognized the issues with the above approaches and offer a method to at least partly address them. A method for operating an internal combustion engine is provided. The method comprises operating at least one turbocharger, operating a start/stop automatic system which automatically switches off the internal combustion engine when a stop condition is met, and automatically starts the internal combustion engine when a starting condition is met, and when the stop condition is met, delaying the automatic switching off of the internal combustion engine by a predefinable delay time ($\Delta t$).

In anther embodiment, a method for a turbocharger in an engine comprises pumping oil to a turbine of a turbocharger using an oil pump. The method includes, under a first condition, shutting off the oil pump immediately in response to an automatic stop condition of the engine, and under a second condition, shutting off the oil pump after a time delay in response to the automatic stop condition of the engine.

For example, if a temperature of the turbine is above a threshold, the oil pump may continue to be operated even after an automatic shut down of the engine is indicated.

In one embodiment, the oil pump may be driven by an external motor, in which case the engine may shut down immediately following the automatic stop condition. In another embodiment, the engine shut down may be delayed along with the oil pump shut down. By continuing to operate the oil pump, oil may continue to be pumped to the turbine to provide continued turbine cooling. In this way, carbonization of the turbocharger may be largely avoided, in particular carbonization of the rotor bearings. As a result, a longer service life of the turbocharger may be provided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
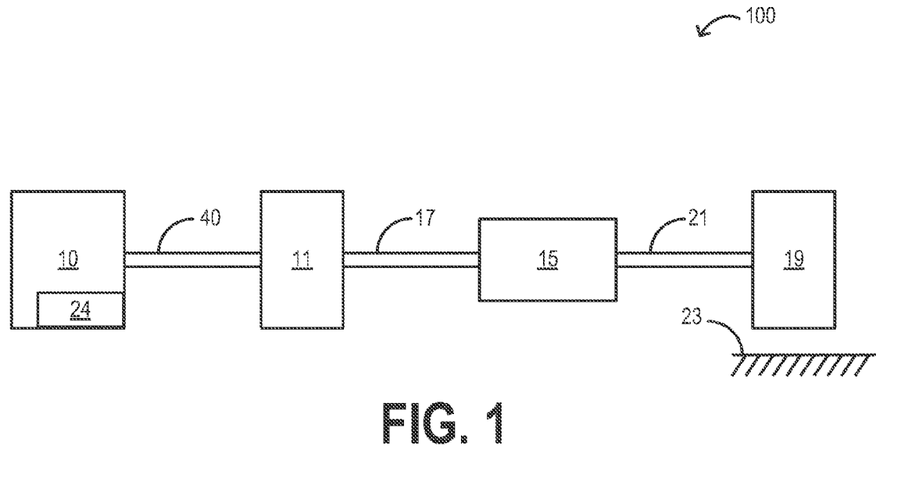
FIG. 1 shows an example vehicle system layout, including a vehicle powertrain.
Figure 2:
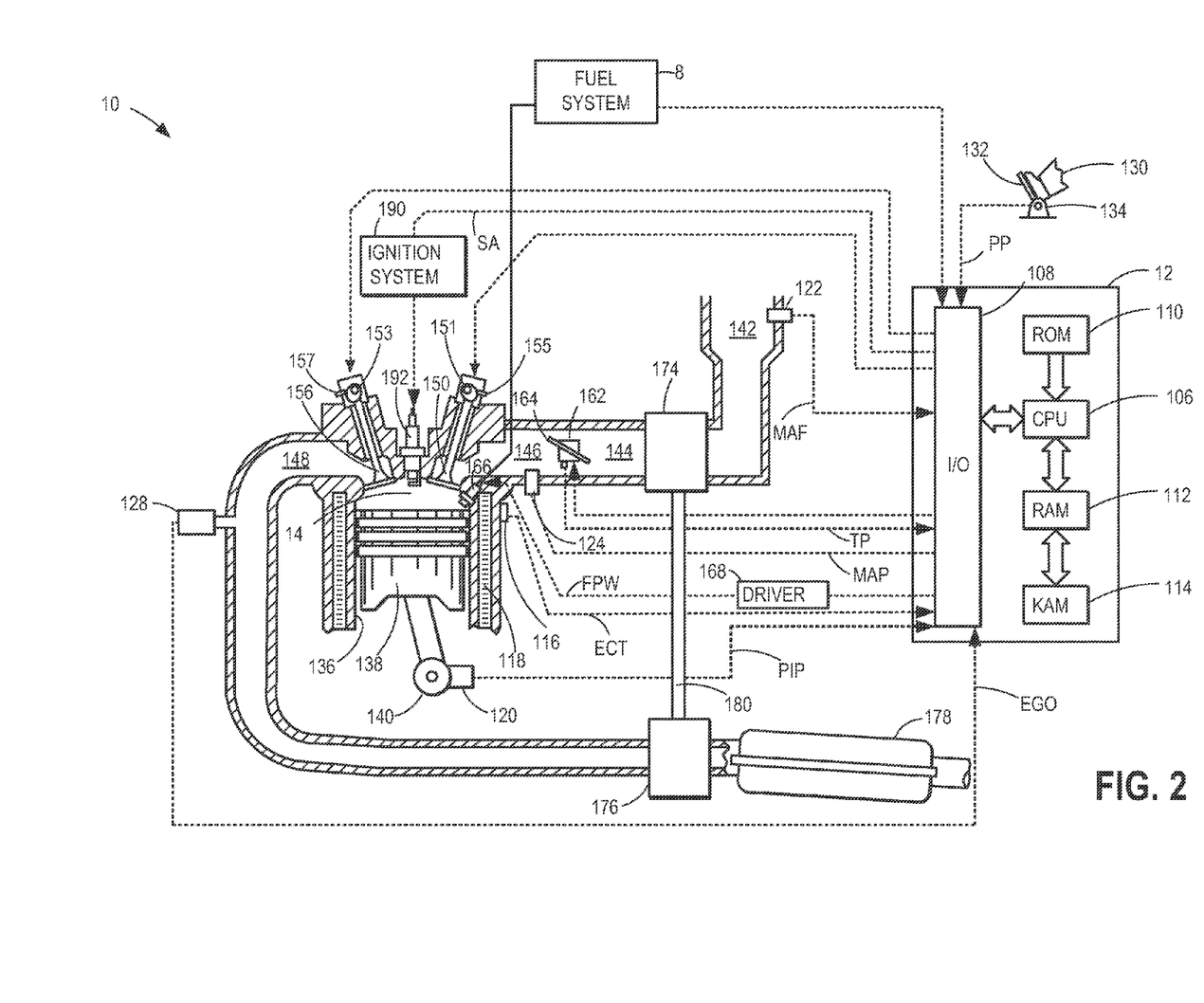
FIG. 2 shows a partial engine view.
Figure 3:
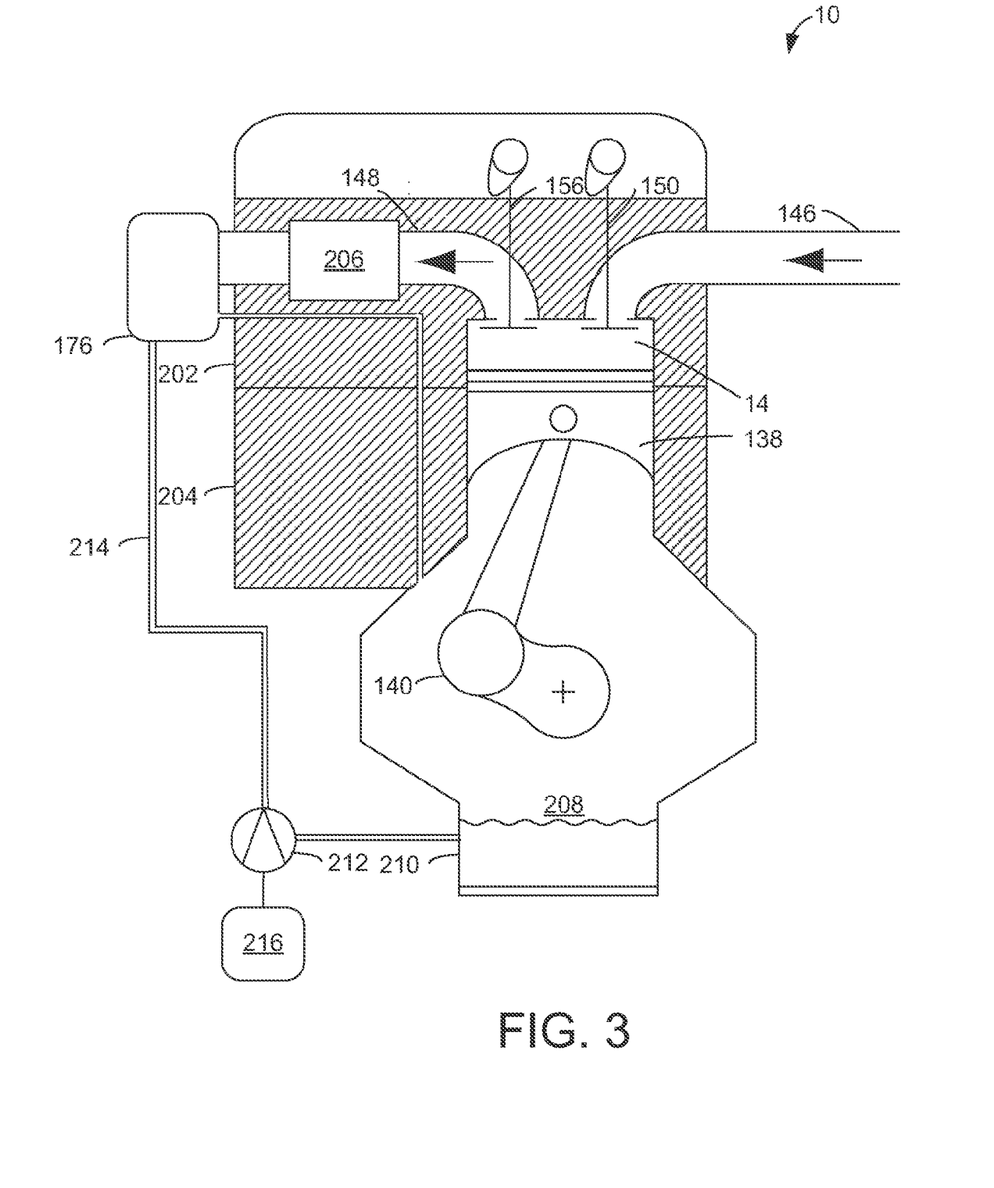
FIG. 3 shows another partial engine view including an external oil pump.
Figure 4:
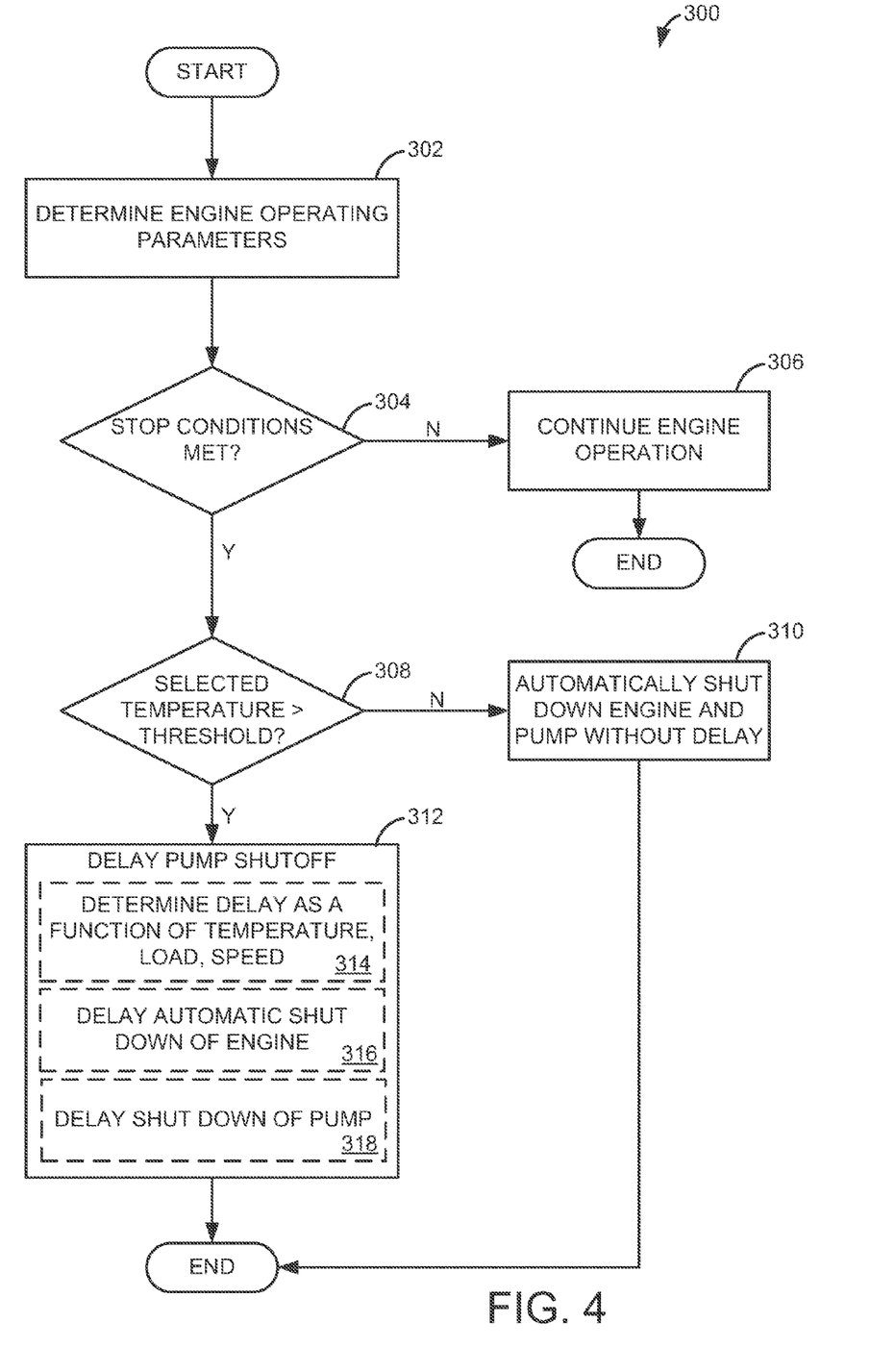
FIG. 4 shows a flow chart illustrting a method according to an embodiment of the present disclosure.
Figure 5:
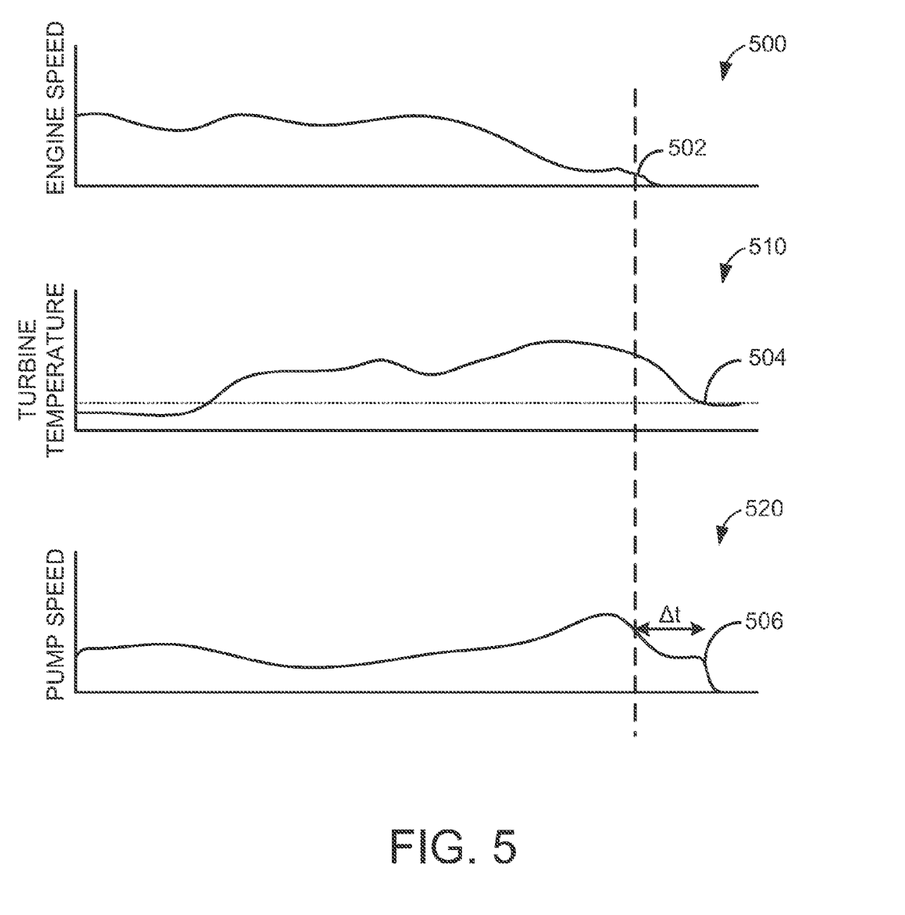
FIG. 5 shows example engine traces for various operating parameters according to an embodiment of the present disclosure.

A turbocharger turbine admits exhaust gas in order to rotate a shaft coupled to a compressor. As a result, the turbine may be exposed to high temperatures. To prevent damage to the turbine, oil may be pumped through the turbine. In vehicles with an automatic start/stop system, the engine may be automatically shut down in response to one or more operating parameters. Under these conditions, an oil pump that pumps oil to the turbine may continue to be operated after engine stop conditions have been met to ensure adequate cooling of the turbine. FIGS. 1-3 show example engine diagrams including an automatic start/stop system, turbocharger, and oil pump. FIG. 4 is a control routine for operating the oil pump. FIG. 5 is example operating parameters during the course of carrying out the control routine of FIG. 4.

FIG. 1 shows a vehicle system 100 including internal combustion engine 10 coupled to torque converter 11 via crankshaft 40. Engine 10 may be a gasoline engine. In alternate embodiments, other engine configurations may be employed, for example a diesel engine. Engine 10 may be started with an engine starting system 24, including a starter, and one or more starter gears. In one example, the starter may be motor-driven (e.g. battery-driven or capacitor driven). In another example, the starter may be a powertrain drive motor, such as a hybrid powerplant connected to the engine by way of a coupling device. The coupling device may include a transmission, one or more gears, and/or any other suitable coupling device. The starter may be configured to support engine restart at low non-zero engine speeds, such as, for example at or below 50 rpm. Alternatively, the engine may be restarted in a low speed range, for example between 50 to 100 rpm. Alternatively, the engine may be restarted in a higher speed range, for example above 200 rpm.

Torque converter 11 is also coupled to transmission 15 via turbine shaft 17. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as a transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to tire 19 via axle 21. Tire 19 interfaces the vehicle (not shown) to the road 23. Note that in one example embodiment, this power-train is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

FIG. 3 shows another partial view of the engine 10. Engine 10 includes the intake and exhaust passages 144 and 148 described with respect to FIG. 2. Additionally, exhaust passage 148 leads to an exhaust manifold 206 integrated into a cylinder head 202 mounted on a cylinder block 204 of the engine 10. The exhaust manifold may be coupled to the exhaust passages of multiple cylinders, in engines including more than one cylinder. The exhaust manifold leads to the turbine 176. In the embodiment depicted, the turbine 176 is positioned outside the cylinder head 202. However, in some embodiments, turbine 176 may be fully or partially integrated into the cylinder head 202. Turbine 176 is configured to receive oil in order to cool the turbine and/or lubricate the turbine bearings. The oil may be provided to the turbine via an external oil pump 212, which pumps oil from an oil pan 210 positioned within the crankcase 208. Oil is pumped through oil line 214 to the turbine 176. After passing through the turbine, oil may be routed to other engine components, such as a heat exchanger (not shown), and/or routed to the engine main oil galley (not shown), and/or as shown in FIG. 3, routed through the cylinder head 202 and block 204, where it may rejoin the oil in the oil pan 210. The oil pump 212 may be driven by one or more belts or pulleys coupled to the engine (not shown) or it may be driven by an external motor 216. The external motor 216 may receive power from the engine battery (not shown in FIG. 3) and may be controlled by the control system of the vehicle (also not shown in FIG. 3).

The externally driven oil pump allows for a method for operating an internal combustion engine of a motor vehicle which can be supercharged with at least one turbocharger, which has a start/stop automatic system which automatically switches off the internal combustion engine when a stop condition is met and automatically starts the internal combustion engine when a starting condition is met, when the stop condition is met, the method switching off of the externally driven oil pump in a delayed amount of time, by a predefinable delay time ($\Delta t$) after the automatic switching off of the internal combustion engine.

A starting condition can arise, for example, when the motor vehicle is stopped and the service brake pedal is released and the accelerator pedal is activated or the parking brake was previously applied and the accelerator pedal is activated, which may be the case, for example, when the vehicle stops at a traffic light. When the vehicle is stationary after a person has entered it, activation of a starting knob or ignition lock with simultaneous activation of the accelerator pedal can constitute a starting request. Further combinations are possible.

A stop condition is formed in a traveling vehicle by activating the service brake pedal or via a corresponding signal of a so-called brake assistant and a determined vehicle speed of preferably less than approximately 5 km/h and in particular preferably approximately 0 km/h (stop condition vehicle speed). Alternatively or additionally to this, the stop condition can also be determined from rapid closing of the throttle valve of the internal combustion engine or from the position of the accelerator pedal and the previously mentioned stop condition vehicle speed.

The delayed switching off of the internal combustion engine by the predefinable delay time when a stop condition is met ensures that the internal combustion engine cannot be switched off automatically by the start/stop automatic system directly when a stop condition is met, in particular after operation with a large load. The internal combustion engine preferably continues to be operated in idling mode during the delay time, which safeguards the flow of oil to the turbocharger and therefore the cooling thereof. However, it is also conceivable within the sense of the disclosure to maintain the oil pressure or oil flow in the after-running mode by a (variable or invariable) oil pump, that is to say externally driven oil pump, which is not driven directly by the internal combustion engine, as is possible, for example, in the case of a demand-regulated oil pump. This is advantageous to the extent that the internal combustion engine can then be switched off without interrupting the flow of oil. This means that a flow of oil which may be utilized under certain circumstances to cool the turbocharger can be maintained for a certain period of time by an externally driven oil pump after the internal combustion engine switches off until certain peripheral conditions are brought about. The specific period of time preferably corresponds here to the delay time, more details on the peripheral conditions being given below. The supply of lubricant for the rotor bearings of the turbocharger is therefore maintained at least for the delay time and the conduction of the heat away from the rotor shaft of the turbocharger is ensured. The lubricating oil in the turbocharger, in particular at the bearing points, is protected against overheating, which avoids carbonization of the lubricating oil present in the rotor bearings as a result of the subsequent heating of the shaft caused by the hot turbine, and therefore the bearings are prevented from being covered in soot.

After the predefinable delay time has passed, the internal combustion engine is favorably cooled by the operation in the idling mode to such an extent that switching off of the internal combustion engine no longer brings about a risk of the lubricating oil in the turbocharger being carbonized. The same applies analogously to the delayed switching off of the externally driven oil pump, which causes heat to be conducted away by oil which continues to flow, with the result that switching off of the externally driven oil pump no longer brings about a risk of the lubricating oil in the turbocharger being carbonized. If the stop condition is still met after the predefinable delay time has passed, the internal combustion engine is switched off in a conventional way by the start/stop automatic system or the externally driven oil pump is switched off. However, if the stop condition is canceled by a starting condition during the delay time, for example because a user releases the service brake pedal and activates the accelerator pedal, the start/stop automatic system goes into the conventional mode when a starting condition is met, that is to say the internal combustion engine or the externally driven oil pump is not switched off.

According to one embodiment of the disclosure, the predefinable delay time is determined as a function of at least one operating parameter including the engine torque, engine speed, oil temperature, coolant temperature and exhaust gas temperature. As a result, precise determination of the operating state of the internal combustion engine, in particular of the load state, is possible at any time. If, for example, the output torque or engine torque of the internal combustion engine is not immediately available for monitoring or evaluation, it is possible to infer the load state of the internal combustion engine from, for example, its exhaust gas temperature. The higher the exhaust gas temperature of the internal combustion engine, the greater the load state in which the internal combustion engine is operated. Alternatively or additionally to this, it is possible, for example, to measure the oil temperature and/or the coolant temperature and/or the exhaust gas temperature directly and use it to determine the load state of the internal combustion engine. It is therefore also possible to use a plurality of the above-mentioned operating parameters in any desired combination to determine the operating state of the internal combustion engine and therefore to determine the instantaneous load state of the internal combustion engine. These specified operating parameters are, of course, also included in the decision of the switch-off delay of the externally driven oil pump.

The delay time which is preferably utilized for the after-running of the internal combustion engine in the idling mode for the latter to be able to cool down sufficiently is determined as a function of the operating state or load state of the internal combustion engine and the time period for which the internal combustion engine was operated in this load state directly before the occurrence of the stop condition, with the result that after the switching off of the internal combustion engine carbonization of the lubricating oil cannot occur in the turbocharger or the turbocharger bearings. Generally, a larger value is selected for the delay time the greater the load state of the internal combustion engine and therefore the operating temperature thereof is selected directly before the occurrence of the stop condition. This applies analogously also to the externally driven oil pump, that is to say the delay time which is necessary for the after-running of the externally driven oil pump (with the internal combustion engine switched off), is determined as a function of the operating state or load state of the internal combustion engine and the time period for which the internal combustion engine was operated in this load state directly before the occurrence of the stop condition, with the result that despite the switching off of the internal combustion engine the lubricating oil in the turbocharger or the turbocharger bearings may not become carbonized. Generally, a larger value is also selected for the delay time the greater the load state of the internal combustion engine and therefore the operating temperature thereof is selected directly before the occurrence of the stop condition.

On the other hand, the predefinable delay time according to the disclosure can also be predefined with zero seconds, with the result that the start/stop automatic system can directly switch off the internal combustion engine when a stop condition is met or the externally driven oil pump is switched off immediately. This is, for example, the case if the internal combustion engine was not operated in a large load range before the occurrence of the stop condition and therefore there is no risk of the lubricating oil which is present in the rotor bearings of the turbocharger being carbonized if the internal combustion engine is switched off immediately. In this case, the start/stop automatic system carries out its conventional function without delay when a stop condition is met, as a result of which an optimum saving in fuel and the largest possible reduction in exhaust gas emissions can be achieved.

In addition, in one embodiment of the method according to the disclosure there is provision that the predefinable delay time is, for example, permanently predefined by a service technician, that is to say for example programmed and is not changed during the subsequent operation of the internal combustion engine. In this case, a value, which essentially ensures under all or most operating conditions of the internal combustion engine that there is no risk of carbonization of the lubricating oil when the internal combustion engine or the externally driven oil pump is switched off after the delay time has passed, will be selected for the delay time. The permanently predefined delay time is advantageous insofar as it is possible to completely dispense with the detection, monitoring and evaluation of operating parameters during the operation of the internal combustion engine with respect to the method according to the disclosure.

The present disclosure is also particularly suitable for retrofitting motor vehicles with a start/stop automatic system since all that is necessary is, as described above, to determine the load state of the internal combustion engine and the delay time therefrom on the basis of at least one operating parameter which is already available in a vehicle, and subsequently to output the stop signal, delayed by the delay time, of the start/stop automatic system, or to interrupt said stop signal, when a stop condition is met. The same applies analogously to the externally driven oil pump, the switching off operation of which is delayed by the delay time despite the immediate switching off of the internal combustion engine due to the stop signal. The aforementioned operating parameters are often accessible via a bus system, for example a CAN (Control Area Network) or LIN (Local Interconnect Network), which is used in vehicles.

FIG. 4 shows a flowchart of an exemplary embodiment of a method 300 according to the disclosure. The method can be carried out by a control unit, for example controller 12 of the motor vehicle. At 302, method 300 comprises determining engine operating parameters. The operating parameters may include engine torque, engine speed, oil temperature, exhaust gas temperature and coolant temperature, throttle valve position, brake pedal position, and/or accelerator pedal position and the vehicle speed. At 304, it is determined whether a stop condition is met. Such a condition is met, for example, if the brake pedal in a traveling vehicle is activated and a vehicle speed is below a threshold, such as less than approximately 5 km/h and particularly preferably approximately 0 km/h (stop condition vehicle speed). Alternatively or additionally to this, the stop condition can also be determined by rapid closing of the throttle valve or the position of the accelerator pedal and the previously mentioned stop condition vehicle speed. The stop condition for an automatic stop as utilized herein may refer to a stop condition determined by a controller without an operator of the vehicle indicating an engine shut down, such as without an operator switching off an ignition key.

If it is determined at 304 that a stop condition is not present ("N"), the method 300 according to the disclosure continues to operate the vehicle using the current operating parameters at 306, after which the method 300 ends. It is to be noted that the method 300 according to the disclosure can be carried out again at any time and as often as desired.

If it is determined at 304 that a stop condition is met ("Y"), the method 300 according to the disclosure continues to 308 in which it is determined if a selected temperature is above a threshold. The selected temperature may include the exhaust gas temperature, the oil temperature, and/or the coolant temperature. The threshold may be any suitable temperature, depending on which temperature is measured, which indicates a high engine, coolant, and/or exhaust temperature that may cause turbine damage if cooling were to end during the automatic stop.

If it is detected at 308 that the exhaust gas temperature and/or the oil temperature and/or the coolant temperature are/is not higher than the threshold ("N"), the method 300 according to the disclosure continues to 310 in which the internal combustion engine is switched off without delay if, as has been detected at 304, the stop conditions are met. When the automatic stop conditions are satisfied, controller 12 may initiate an engine shutdown by shutting off fuel and spark to the engine. An externally driven oil pump can then also be switched off without delay. The method according to the disclosure then ends. As already mentioned, the method according to the disclosure can be carried out again at any time and as often as desired.

If it is detected at 308 that the exhaust gas temperature and/or the oil temperature and/or the coolant temperature is/are higher than the threshold ("Y"), the method 300 according to the disclosure continues to 312 to delay oil pump shut off. Delaying the shut off the oil pump may allow the oil pumped to the turbine to continue such that turbine cooling and lubrication can proceed until the turbine is cooled a sufficient amount. Delaying the shut off includes determining a delay time $\Delta t$ at 314. The delay time may be determined as a function of engine, exhaust, and/or coolant temperature, engine speed, engine load, etc. In one example, for a first turbine temperature above the threshold by a first amount, the controller may shutdown the engine in response to automatic stop condition, but continue pump operation for a first duration. For a second turbine temperature above the threshold by a second, greater amount (e.g., a higher temperature than the first temperature), the controller may shutdown the engine responsive to the automatic stop condition, but continue the pump operation for a second, longer duration than the first duration. Further, the speed of the electric oil pump may be adjusted during the engine shutdown condition, for example with higher pump speeds selected for higher turbine temperatures, rather than, or in addition to, longer pump operation after the shutdown. In other embodiments, the speed of the turbine may be reduced responsive to engine shut down, to conserve battery power, for example.

In some embodiments, the internal combustion engine may continue to be operated in the idling mode for the previously determined delay time $\Delta t$, that is to say, it may not be switched off during the predetermined delay time at 316. This may be necessary when the pump is mechanically driven by the engine. In other embodiments, the engine may be shut off immediately and the externally driven oil pump may continue to be operated for the delay time $\Delta t$, for example by an external motor. In both embodiments, the oil pump is not shut down until after the delay time has passed at 318. Once the delay time has passed, the pump and/or engine may be shut off, after which the method is terminated. As already mentioned, the method 300 according to the disclosure can be carried out again at any time and as often as desired.

Thus, method 300 provides for delaying oil pump shut off if one or more temperatures of the engine are above a threshold. The oil pump may continue to be operated when the temperature of the turbine is above a threshold. The turbine temperature may be estimated based on other engine operating temperatures, such as exhaust temperature, oil temperature, and/or coolant temperature. If the turbine temperature is above the threshold, the oil pump shut down may be delayed a predetermined amount of time following engine shut down after an automatic stop is indicated. In other embodiments, both the engine and oil pump shut down may be delayed. If the turbine temperature is not above the threshold, the oil pump may be shut off concurrently with the engine following an indication of an automatic stop, e.g., immediately following the determination to automatically shut down the engine and without the time delay. In both conditions, e.g. a first condition wherein turbine temperature is below a threshold and a second condition wherein turbine temperature is above the threshold, the shutdown of the oil pump and the engine are in response to the automatic stop condition of the engine being met, as described above.

The delay time $\Delta t$ is determined in the described exemplary embodiment on the basis of the exhaust gas temperature and/or the oil temperature and/or the coolant temperature. If one of these temperatures has exceeded a certain limiting value, or threshold, this indicates an operating state of the internal combustion engine with a large load demand. Accordingly, the higher the previously detected temperature, and the further the specific limiting value has been exceeded, the longer the delay time Δt will be selected or defined. It is within the sense of the disclosure that the delay time Δt can have a different absolute value for delaying the switching off of the internal combustion engine than the delay time Δt for delaying the switching off of the externally driven oil pump if the internal combustion engine is switched off without delay.

It is also to be noted that the delay time Δt may be adapted to the respective current operating conditions of the internal combustion engine. This ensures that the internal combustion engine or the externally driven oil pump can be switched off as soon as permitted by the operating state, to reduce the risk of carbonization of the lubricating oil in the turbocharger.

The method according to the disclosure is not restricted to the exemplary embodiment described herein and shown in FIG. 4. For example, the delay time Δt can be defined as having a specified absolute value without re-determining said value whenever the stop condition is met. It is therefore possible, for example, also to use operating parameters other than those used in the exemplary embodiment such as the oil temperature, exhaust gas temperature and/or coolant temperature, for determining the delay time Δt, for example the engine torque, the engine speed or even other operating parameters from which the load state of the internal combustion engine can be determined or calculated. Furthermore, the method according to the disclosure can also be applied in motor vehicles with a hybrid drive which, in addition to an internal combustion engine, also has at least one electric motor. Since the oil temperature and water temperature can be low when the external temperatures are low, the turbocharger can, however, also nevertheless reach the critical temperature due to driving maneuvers, and a time integrator can alternatively or additionally also prevent the shutting down of the engine above a critical time increment as a function of the pedal position, engine characteristic diagram and operating period in said time integrator.

FIG. 5 shows example engine traces including engine speed 500, turbine temperature 510, and pump speed 520, according to an embodiment of the present disclosure. Each trace depicts the respective operating parameter from minimum amount (e.g., zero) to a maximum amount along the y-axis, and time along the x-axis. At 502, engine speed drops below a threshold amount, e.g. 600 RPMs. If other automatic stop conditions have been met, such as brake pedal being depressed, etc., the engine may be automatically shut down, by stopping fuel injection and spark to the engine, for example, as indicated by the vertical dashed line. Due to the automatic stop, the engine speed spins down to zero. The turbine temperature has a threshold, indicated by the horizontal dashed line, above which it may continue to receive engine oil in order to be cooled. As the turbine temperature is above the threshold at the time of automatic stop of the engine, the pump shutoff is delayed, as indicated by the delay time Δt. During the pump operation following the engine shut down, the pump is operated, however, in the embodiment depicted, it is operated at a lower speed than when the engine is operating. After a predetermined amount of time, which may be based on the turbine temperature (for example, the delay time may end when turbine temperature drops below the threshold at 504), the pump may be shutoff, as seen at 506.

In one embodiment, the method according to the disclosure is used in a motor vehicle with an internal combustion engine, at least one turbocharger for supercharging the internal combustion engine and a start/stop automatic system for automatically switching off the internal combustion engine when a stop condition is met and for automatically starting the internal combustion engine when a starting condition is met. The motor vehicle also has a control device with which the method according to the disclosure can be carried out as described herein. It is therefore possible to maintain a flow of oil since either the internal combustion engine or an externally driven oil pump can continue to be operated for a delay time.

In another embodiment, a method for a turbocharger in an engine may include, if an automatic stop condition of the engine is met, automatically shutting down the engine, shutting down an oil pump configured to pump oil to a turbine of the turbocharger concurrently with the automatic engine shut down under a first condition, and shutting down the oil pump after a predetermined time delay following the automatic engine shut down under a second condition. The first condition may include when turbine temperature is below a threshold, and the second condition may include when turbine temperature is above the threshold. The predetermined time delay may be based on the turbine temperature, and may be longer the higher the temperature of the turbine is. Additionally, both the first and second conditions include the automatic stop condition of the vehicle being met It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
   operating a turbocharger;
   operating a start/stop automatic system which automatically switches off the engine when a stop condition is met, and automatically starts the engine when a starting condition is met; and
   when the stop condition is met, delaying the automatic switching off of the engine by a predefinable delay time (Δt) if a temperature of oil supplied to the turbocharger is above a threshold temperature.

2. The method of claim 1, wherein, when the stop condition is met, delaying switching off of an externally driven oil pump by a predefinable delay time (Δt) after the automatic switching off of the engine.

3. The method of claim 1, wherein the predefinable delay time (Δt) is determined as a function of at least one operating parameter including one or more of engine torque, engine speed, oil temperature, coolant temperature, and exhaust gas temperature.

4. The method of claim 1, wherein the predefinable delay time (Δt) is permanently predefined and is not changed during operation of the engine.

5. The method of claim 1, further comprising controlling the automatic start/stop with a control device.

6. A method for a turbocharger in an engine, comprising:
pumping oil to a turbine of the turbocharger with an oil pump;
under a first condition, shutting off the oil pump in response to an automatic stop condition of the engine; and
under a second condition, shutting off the oil pump later than under the first condition in response to the automatic stop condition of the engine.

7. The method of claim 6, wherein the first condition comprises a temperature of the turbine being below a threshold.

8. The method of claim 7, wherein the second condition comprises the temperature of the turbine being equal to or above the threshold.

9. The method of claim 7, wherein the temperature of the turbine is estimated based on one or more of an exhaust temperature, oil temperature, and coolant temperature.

10. The method of claim 6, further comprising, under both the first and second conditions, automatically shutting off the engine in response to the automatic stop condition of the engine.

11. The method of claim 10, wherein automatically shutting off the engine comprises shutting off the engine immediately in response to the automatic stop condition under both the first and second conditions.

12. The method of claim 10, wherein automatically shutting off the engine comprises shutting off the engine immediately in response to the automatic stop condition under the first condition and automatically shutting off the engine after a time delay in response to the automatic stop condition under the second condition.

13. The method of claim 6, further comprising, under the second condition, continuing to operate the oil pump during a time delay while automatically shutting off the engine immediately in response to the automatic stop condition of the engine, the oil pump driven by an external motor.

14. The method of claim 6, wherein the automatic stop condition of the engine is based on one or more of a brake pedal position, engine speed, and engine load.

15. A system, comprising:
an engine;
a turbocharger including a turbine driven by exhaust gas of the engine;
an oil pump driven by an external motor;
an oil line configured to deliver oil pumped by the oil pump to the turbine; and
a controller including instructions to:
if an automatic stop condition of the engine is met, automatically shut down the engine;
shut down the oil pump concurrently with the automatic engine shut down under a first condition; and
shut down the oil pump after a predetermined time delay following the automatic engine shut down under a second condition.

16. The system of claim 15, wherein the predetermined time delay is a function of one or more current engine operating parameters including engine torque, engine speed, oil temperature, coolant temperature, and exhaust gas temperature.

17. The system of claim 15, wherein the first condition comprises one or more of an exhaust temperature, oil temperature, and coolant temperature being below a threshold.

18. The system of claim 15, wherein the second condition comprises one or more of an exhaust temperature, oil temperature, and coolant temperature being above a threshold.

19. The system of claim 15, wherein the automatic stop condition of the engine is based on one or more of a brake pedal position, engine speed, and engine load.

20. The system of claim 15, wherein the time delay is a set time delay that does not change regardless of current operating parameters.

* * * * *